(12) United States Patent
Uekawa et al.

(10) Patent No.: US 7,203,391 B2
(45) Date of Patent: Apr. 10, 2007

(54) OPTICAL MODULE

(75) Inventors: Masahiro Uekawa, Kanagawa (JP); Takeshi Takamori, Tokyo (JP); Hironri Sasaki, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 11/271,748

(22) Filed: Nov. 14, 2005

(65) Prior Publication Data

US 2006/0115207 A1 Jun. 1, 2006

(30) Foreign Application Priority Data

Nov. 30, 2004 (JP) .............. 2004-347406

(51) Int. Cl.
*G02B 6/12* (2006.01)
*G02B 6/32* (2006.01)
*G02B 6/26* (2006.01)
*G02B 6/42* (2006.01)

(52) U.S. Cl. .............. 385/14; 385/15; 385/31; 385/33; 385/35; 385/39; 385/47; 385/49

(58) Field of Classification Search .............. 385/14
See application file for complete search history.

(56) References Cited

U.S. PATENT DOCUMENTS 5,611,006 A * 3/1997 Tabuchi .............. 385/14
6,057,925 A * 5/2000 Anthon .............. 356/419
6,683,733 B2 * 1/2004 Uekawa et al. .............. 359/819
6,850,674 B2 * 2/2005 Haraguchi et al. .............. 385/49
6,985,647 B2 * 1/2006 Takamori .............. 385/14

FOREIGN PATENT DOCUMENTS

JP 2001-100062 4/2001

OTHER PUBLICATIONS

Tadatsohi Tomimoto, "Development of 10-Gbits/s surface mount-type module constituted with side-illuminated mirror PIN-PD", Oki Technical Review, Oct. 2003/Issue 196 vol. 70 No. 4, published by Oki Electric Co., Ltd.

* cited by examiner

*Primary Examiner*—Frank G. Font
*Assistant Examiner*—Ryan Lepisto
(74) *Attorney, Agent, or Firm*—Vanable LLP; Michael A. Sartori; Catherine M. Voorhees

(57) ABSTRACT

An optical module 100 comprises a substrate 110 at which V-shaped groove 110a and 110b are formed through etching to extend along directions perpendicular to each other and a cube-type wavelength division multiplexer 150 that allows light to be transmitted or reflected on a 90° angle depending upon the wavelength of the light, lens elements 140a and 140b constituted of silicon, a light emitting element 120 that emits light to be directed to the outside via a lens element and the wavelength division multiplexer and a light receiving element 130 that receives incoming light from the outside via the wavelength division multiplexer and a lens element, all disposed on the substrate. The components, which contribute to miniaturization of the module, can be mounted all together on a single substrate and thus, the mass productivity is greatly improved and the module can be offered at a more affordable price.

18 Claims, 14 Drawing Sheets

PRIOR ART

OPTICAL MODULE

CROSS REFERENCE TO RELATED APPLICATIONS

The disclosure of Japanese Patent Application No. JP2004-347406, filed on Nov. 30, 2004, entitled "OPTICAL MODULE". The contents of that application are incorporated herein by reference in their entirety.

BACKGROUND OF THE INVENTION

1. Field of the Invention

The present invention relates to an optical module, and more specifically, it relates to an optical transmission/reception module ideal in applications in which light signals with at least two different wavelengths are exchanged through a single optical fiber.

2. Description of the Related Art

The single-fiber bidirectional communication achieved by using a single optical fiber through which two types of light signals with different wavelengths are propagated bidirectionally has become increasingly common in optical communication applications such as "fiber to the home" (FTTH). The bidirectional communication may be achieved by inputting light with two different wavelengths to a single optical fiber.

In such single fiber bidirectional communication, a light signal with a wavelength $\lambda 1$ for transmission is originated at point A at one end of an optical fiber and a signal with a wavelength $\lambda 2$ different from $\lambda 1$ is originated at point B at the other end of the optical fiber. At point B, the light signal with the wavelength $\lambda 1$ transmitted from point A is received and likewise, the light signal with the wavelength $\lambda 2$ transmitted from point B is received at point A. Since the light signals with the wavelength $\lambda 1$ and the wavelength $\lambda 2$ are propagated along opposite directions through the optical fiber, a wavelength division multiplexer having a function of identifying and separating the individual wavelengths is normally installed at each end of the optical fiber.

FIG. 20 schematically shows a structure that may be adopted in single fiber bidirectional communication. In the example presented in FIG. 20, a wavelength division multiplexer 2a is connected to one end of an optical fiber 1 on point A side, and a laser diode (hereafter referred to as an LD) 3a and a photodiode (hereafter referred to as a PD) 4a are connected to the wavelength division multiplexer 2a. Likewise, a wavelength division multiplexer 2b is connected at an end of the optical fiber 1 on point B side, with an LD 3b and a PD 4b connected to the wavelength division multiplexer 2b. Light with a wavelength $\lambda 1$ emitted from the LD 3a passes through the wavelength division multiplexer 2a, and is then identified at the wavelength division multiplexer 2b to be directed into the PD 4b. Likewise, light with a wavelength $\lambda 2$ emitted from the LD 3b passes through the wavelength division multiplexer 2b, and is then identified at the wavelength division multiplexer 2a to be directed into the PD 4a.

It is essential in further expansion of optical communication to make available a compact and affordable transmission/reception module with such a wave discriminating function and integrated functions for transmitting and receiving optical signals to facilitate widespread use at homes and offices.

In reference to FIG. 21, a transmission/reception module for single fiber bidirectional optical communication achieved in the related art is explained (refer to p208 "Receptacle Type Bidirectional Wavelength Multiplexing Optical Module I", Masahiro Ogusu et al., Electronic Information Communication Convention, 1996, Electronics Society Seminar, C-208). In this module, a wavelength filter 21 achieving wavelength selectivity is fixed inside a rectangular parallelopiped housing 20, an optical fiber 27, an LD 22 and a PD 23 are fixed onto the external wall of the housing 20, and an optical fiber lens 24, an LD lens 25 and a PD lens 26 are fixed to the optical fiber 27, the LD 22 and the PD 23 respectively.

A light signal with a wavelength $\lambda 1$ emitted from the LD 22 is converted to a parallel beam at the lens 25, is reflected at a 90° angle at the wavelength filter 21, is focused through the optical fiber lens 24 onto the optical fiber 27 and is propagated. A light signal with a wavelength $\lambda 2$ having been propagated through the optical fiber 27 is converted to a parallel beam at the optical fiber lens 24, is transmitted through the wavelength filter 21 and is focused onto the PD 23 via the PD lens 26. This structure allows the module to function as a transmission/reception module for single fiber bidirectional optical communication.

However, the structure in the related art described above requires the optical fiber 27, the LD 22, the PD 23, the optical fiber lens 24, the LD lens 25 and the PD lens 26 to be positioned with exact accuracy for optical axis alignment, which poses a great deal of difficulty in reducing the manufacturing cost or achieving good mass productivity.

SUMMARY OF THE INVENTION

An object of the present invention, which has been achieved by addressing the problems of the optical module in the related art described above, is to provide a new and improved optical module that enables high precision mounting and improved productivity, and can be provided as a more compact module unit.

In order to achieve the object described above, the present invention provides an optical module comprising a substrate having a first groove structure formed through etching along a first direction and a second groove structure formed through etching along a second direction, a wavelength division multiplexer disposed on the substrate, which allows light to be transmitted or to be reflected, depending upon the wavelength thereof, a light emitting element-side lens element disposed at the first groove structure, a light receiving element-side lens element disposed at the second groove structure, a light emitting element disposed near an end of the first groove structure, which generates light to be emitted to the outside via the light emitting element-side lens element and the wavelength division multiplexer and a light receiving element disposed near an end of the second groove structure, which receives incoming light from the outside via the wavelength division multiplexer and the light receiving element-side lens element.

In this optical module, the two optical elements, i.e., the lens elements, used in correspondence to different wavelengths are mounted on a single substrate by disposing the lens elements at the groove structures that are formed at the substrate through etching to be used for positional alignment. In addition, a cube-type wavelength division multiplexer is used. These structural features allow the optical module to be provided as a more compact unit.

Furthermore, the light emitting element, the light receiving element, the lens elements and the wavelength division multiplexer can be mounted all together on a single substrate (e.g., by using an automatic mounter), and thus, it is not necessary to put aside a special time slot for optical alignment during the mounting process, which greatly improves the mass productivity and makes it possible to offer the module at a more affordable price.

The optical module according to the present invention may be adopted in the following applications. However, the present invention is not limited to these examples.

The incoming light traveling via the wavelength division multiplexer and the light receiving element-side lens element may be received at the light receiving element after it is reflected at an end of the first groove structure. In this case, a side-illuminated light receiving element that receives light at the bottom surface thereof can be used. Since a side-illuminated light receiving element is less-expensive compared to a side-illuminated light receiving element, the overall price of the module can be lowered.

The module may further include a light transmitting substrate inserted between the substrate and the light receiving element, so that the incoming light is received at the light receiving element via the wavelength division multiplexer, the light receiving element-side lens element and the light transmitting substrate. This structure reduces the extent of electrical crosstalk which is likely to occur when the light emitting element and the light receiving element are mounted on the same substrate.

A bandpass filter may be formed at one of the surfaces of the light transmitting substrate. By adopting this structure, the extent of optical crosstalk attributable to light with a wavelength other than the target wavelength, such as the light emitted by the light emitting element (with a wavelength of, for instance, 1.3 µm) or light with another wavelength (e.g., 1.55 µm) originating from an external network, can be reduced.

A short wavelength pass filter may be formed at a surface of the light receiving element-side lens element and a long wavelength pass filter may be formed at a surface of the light transmitting substrate. Since the bandpass filter is replaced with a long wavelength pass filter and a short wavelength pass filter in this structure, the filter yield is improved without incurring any further mounting costs. As a result, the filter cost can be reduced.

A short wavelength pass filter may be formed at a surface of the wavelength division multiplexer and a long wavelength pass filter may be formed at a surface of the light transmitting substrate. In this structure, the long wavelength pass filter is formed at a surface of the light transmitting substrate and thus, the cost of mounting a separate filter is saved. In addition, since substrates of exactly the same size can be used, the module can be provided as a compact module unit. Since the module size can be as small as approximately 2 mm×2 mm, its applications do not need to be limited by the sizes of specific packages including CAN, mini-DIL and butterfly.

A reflection-reducing member may be formed at at least one of the surfaces of the light transmitting substrate. For instance, an AR coating with which a reflection-reducing effect can be achieved by using light interference may be formed at at least one of the surfaces of the light transmitting substrate.

A diffracting optical element may be formed both at the light emitting element-side lens element and the light receiving element-side lens element. In this structure, a diffracting optical element is formed at each lens element to enable the lens to bend light freely, in addition to condensing light as a regular lens function. Accordingly, this structure can be adopted in conjunction with a light receiving element that receives light at the bottom surface thereof and a higher level of flexibility is afforded in the optical module design.

The light emitting element-side lens element and the light receiving element-side lens element may each be constituted with a silicon micro-lens. A lens element constituted with a silicon micro-lens can be batch manufactured with a high degree of accuracy through etching in a large quantity and is more compact compared to a lens element constituted with a ball lens in the related art. It is to be noted that the silicon micro-lenses used in the present invention may adopt the structure disclosed in Japanese Laid Open Patent Publication No. 2002-328204, for instance. In addition, quartz may be used as an alternative material for the lens elements.

The optical module may also include a third groove structure formed at the substrate to extend along the direction of the outgoing light and the incoming light and an external-side lens element disposed at the third groove structure. In this structure, the lens element provided on the external network side, too, is disposed at a groove structure, which allows the lens element to be mounted together with the other component members. As a result, a further reduction in the production cost is achieved. In addition, since a filter can be mounted at the rear surface of the external-side lens element or at the side surface of the wavelength division multiplexer located toward the external-side lens element, the extent of optical crosstalk is further reduced.

A diffracting optical element may be formed at the external-side lens element. In this structure, the diffracting optical element is formed at the lens element to enable the lens to bend light freely, in addition to condensing light as a regular lens function. Accordingly, this structure can be adopted in conjunction with a light receiving element that receives light at the bottom surface thereof, and a higher level of flexibility is afforded in the optical module design, as explained earlier.

The external-side lens element may be constituted with a silicon micro-lens. A lens element constituted with a silicon micro-lens can be batch manufactured with a high degree of accuracy through etching in a large quantity and is more compact compared to a lens element constituted with a ball lens in the related art. In addition, quartz may be used as an alternative material for the lens elements.

The light emitted from the light emitting element may be converted to a parallel light flux at the light emitting element-side lens element.

As described above, according to the present invention, the two optical elements, i.e., the lens elements, used in correspondence to different wavelengths are mounted on a single substrate by disposing the lens element at the groove structures formed through etching at the substrate to be used for positional alignment. In addition, a cube-type wavelength division multiplexer is used. These structural features allow the optical module to be provided as a more compact unit.

Furthermore, the light emitting element, the light receiving element, the lens elements and the wavelength division multiplexer can be mounted all together on a single substrate (e.g., by using an automatic mounter), and thus, it is not necessary to put aside a special time slot for optical alignment during the mounting process, which greatly improves the mass productivity and makes it possible to offer the module at a more affordable price.

DETAILED DESCRIPTION OF THE PREFERRED EMBODIMENTS

Figure 1:
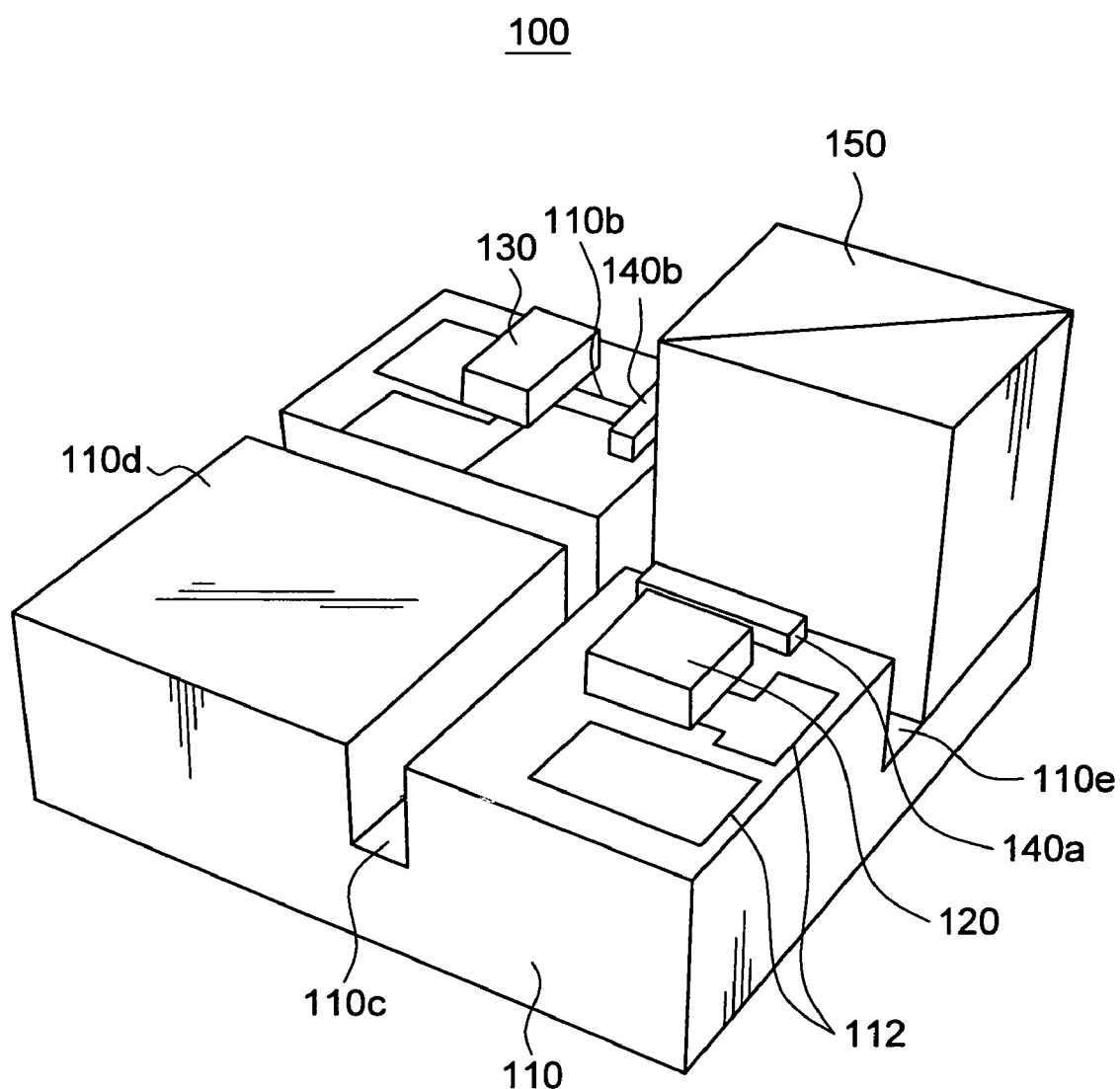
FIG. 1 is a perspective schematically showing the structure adopted in the optical module achieved in a first embodiment.

The following is a detailed explanation of the preferred embodiments of the optical module according to the present invention, given in reference to the attached drawings. It is to be noted that the same reference numerals are assigned in the specification and the drawings to components having substantially identical functions and structural features to preclude the necessity for a repeated explanation thereof.

(First Embodiment)

Figure 2:
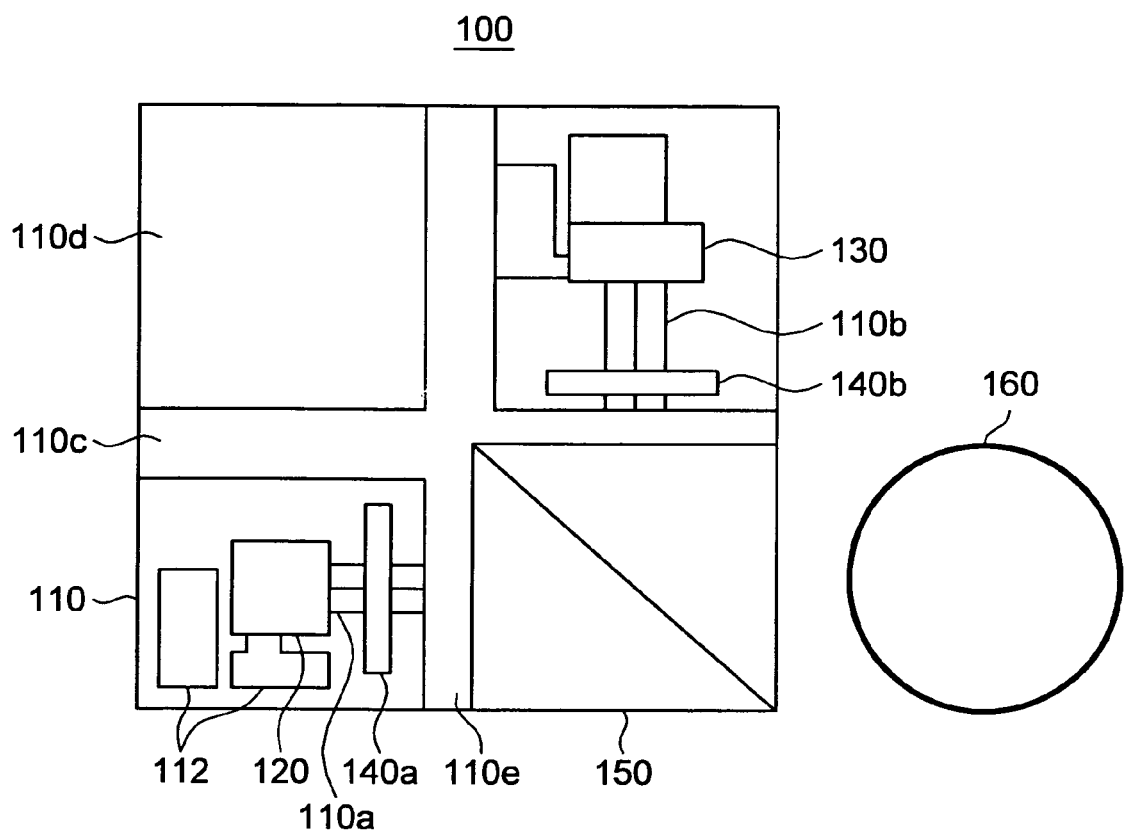
FIG. 2 is a plan view schematically showing the structure adopted in the optical module achieved in the first embodiment.

The first embodiment of the present invention is now explained. FIGS. 1 and 2 schematically show the structure adopted in the optical module achieved in the embodiment, with FIG. 1 showing the structure in a perspective and FIG. 2 showing the structure in a plan view.

As shown in FIGS. 1 and 2, an optical module 100 achieved in the embodiment includes a laser diode (hereafter referred to as an LD) 120 to be used as a light emitting element, a photodiode 130 (hereafter referred to as an LD) to be used as a light receiving element, lens elements 140a and 140b and a wavelength division multiplexer 150 mounted at a substrate 110 at which V-shaped groove 110a and 110b are formed. The following is a detailed explanation of the individual components.

(Substrate 110)

Since the processing technology adopted for processing silicon substrates to be used as platforms has matured, it may be more convenient to constitute the substrate 110 of silicon. As shown in FIGS. 1 and 2, the V-shaped groove 110a and 110b with a V-shaped section are formed at the upper surface of the substrate 110. In addition, the LD 120, the PD 130, the lens elements 140a and 140b and the wavelength division multiplexer 150 all to be detailed later are mounted at the upper surface of the substrate 110. A flat-bottomed groove 110c with a right-angle U-shaped section, a surface 110d where no element is disposed, a stage 110e at which the wavelength division multiplexer 150 to be detailed later is disposed, electrode pads 112 and the like are also formed at the substrate in the example shown in FIG. 1, their shapes and purposes of use may be modified in design as necessary.

(V-shaped Groove 110a and 110b)

The V-shaped groove 110a and 110b are precision processed through etching so as to set the (111) plane group of the silicon material at the inclined surfaces thereof. The V-shaped groove 110a is formed in conjunction with the LD 120, whereas the V-shaped groove 110b is formed in conjunction with the PD 130. The V-shaped groove 110a and the V-shaped groove 110b extend along directions perpendicular to each other. The shapes of the sections of the V-shaped groove 110a and 110b and the like are to be described in further detail later.

(Wavelength Division Multiplexer 150)

The wavelength division multiplexer 150 is disposed at the recessed area of the substrate 110, as shown in FIGS. 1 and 2. The wavelength division multiplexer 150 in the embodiment is a cube-type dielectric filter. The wavelength division multiplexer 150 allows light to be transmitted or be reflected at a 90° angle depending upon the wavelength of the light. The wavelength division multiplexer 150 in the embodiment allows light emitted from the LD 120 (with a wavelength of, for instance, 1.3 μm to be transmitted and reflects light (with a wavelength of, for instance, 1.55 μm) entering from the outside by a 90° angle to direct it to the PD 130.

Figure 21:
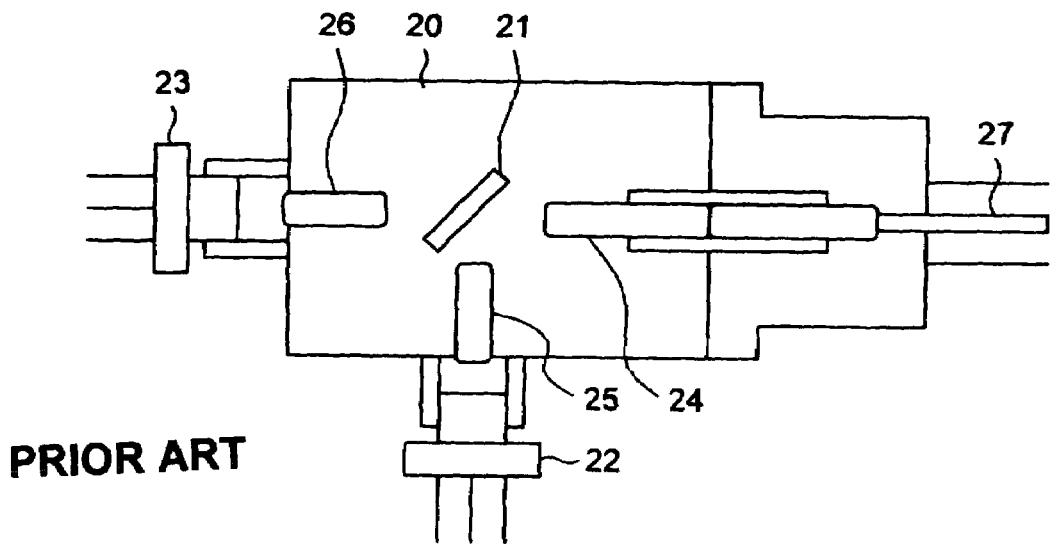
FIG. 21 schematically shows the structure adopted in an optical module in the related art.

One of the advantages of using a cube-type dielectric filter as the wavelength division multiplexer 150 is the greater ease afforded in alignment, compared to that achieved in conjunction with the wavelength filter 21 in the related art shown in FIG. 21. In addition, since the alignment is achieved with ease, a light reflecting surface does not need to range over an excessively large area, and thus, the wavelength division multiplexer can be provided as a compact unit.

(Lens Elements 140a and 140b)

Figure 3:
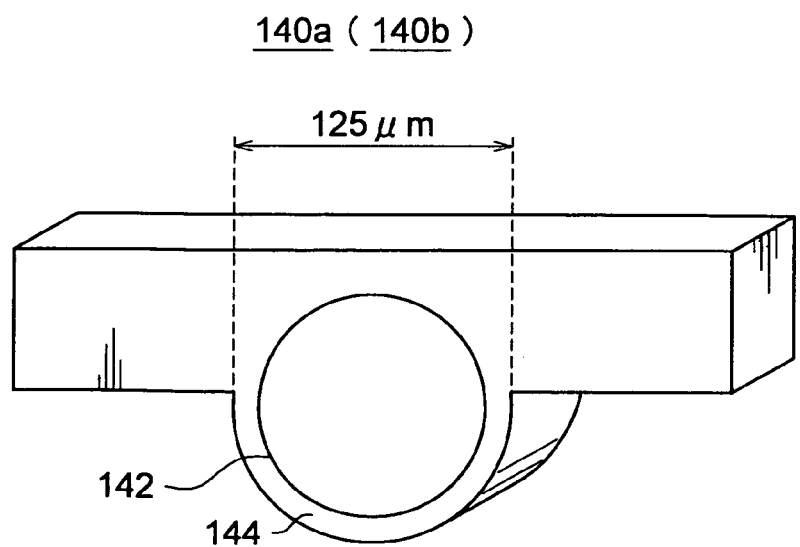
FIG. 3 is a schematic perspective of the structure adopted in the lens element.

The lens elements 140a and 140b in the embodiment are each constituted with a silicon micro-lens. As shown in FIG. 3, the lens elements 140a and 140b each include a lens portion 142 formed at a surface thereof on one side, as shown in FIG. 3. A diffracting optical element with, for instance, a diameter of 110 μm is formed at the lens portion 142. The lens elements 140a and 140b, each having a diffracting optical element formed at the lens portion 142, are able to bend light along an arbitrary direction with ease in correspondence to a specific mask pattern.

In addition, edges 144 of the lens elements are formed so as to assume the shape of a substantially circular arc with a diameter of, for instance, approximately 125 μm to facilitate bonding at the V-shaped groove 110a and 110b.

The shape of the lens elements 140a and 140b described above only represents an example and the diffracting optical elements may have a diameter of 50 to 250 μm may be formed to constitute the lens portions. The shape of the V-shaped groove 110a and 110b should be adjusted in correspondence to the specific shape of the lens elements 140a and 140b.

As shown in FIGS. 1 and 2, the lens element 140a is disposed near the LD 120. The lens portion 142 of the lens elements 140a functions as a collimator lens that converts the light emitted from the LD 120 to a parallel light beam and directs the parallel light beam into the wavelength division multiplexer 150.

The lens element 140b is disposed near the PD 130, as shown in FIGS. 1 and 2. The lens portion 142 of the lens element 140b functions as a focusing lens that focuses light separated at the wavelength division multiplexer 150 and directs the focused light into the PD 130.

(LD 120)

The LD 120 is a light emitting element that emits light and assumes a substantially rectangular parallelopiped shape with an approximately 150 μm thickness, as shown in FIGS. 1 and 2. The LD 120 is disposed near an end of the V-shaped groove 110a, and the light emitted from the LD 120 travels to the outside via the light emitting element-side lens element 140a and the wavelength division multiplexer 150.

(PD 130)

The PD 130 is a light receiving element into which light enters through an end surface thereof, and assumes a substantially rectangular parallelopiped shape with an approximately 150 μm thickness, as shown in FIGS. 1 and 2. The PD 130, disposed near an end of the V-shaped groove 110b, receives incoming light from the outside via the wavelength division multiplexer 150 and the light receiving element-side lens element 140b.

Figure 5:
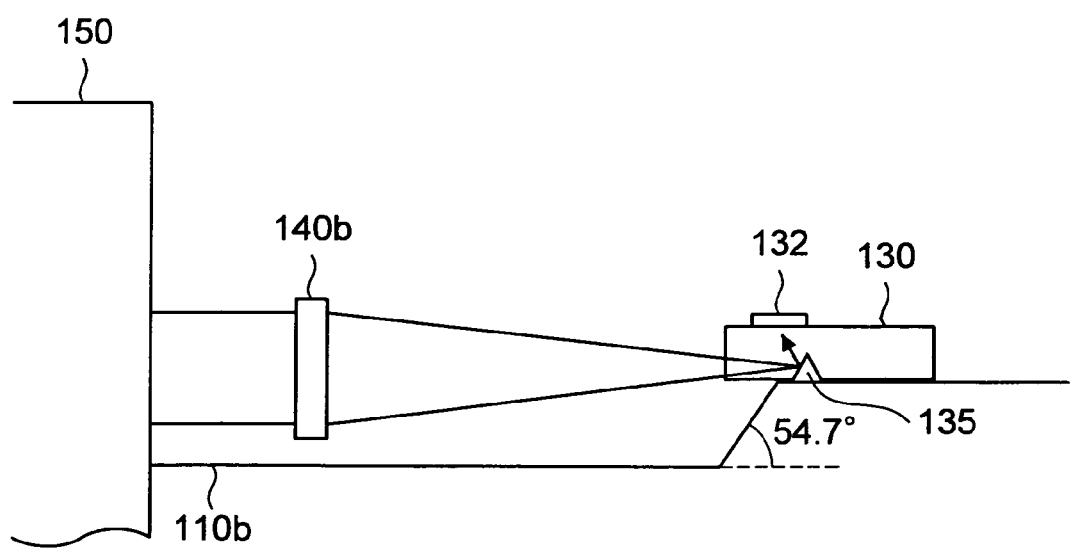
FIG. 5 illustrates the optical path extending between the lens element and the PD in the first embodiment.

FIG. 5 illustrates the positional relationship between the light receiving element-side lens element 140b disposed at the V-shaped groove 110b and the PD 130. As shown in FIG. 5, light having been taken into the optical module 100 via the wavelength division multiplexer 150 is then taken into the PD 130 via the lens element 140b. The PD 130 used in the embodiment is a side-illuminated light receiving element. A reflecting surface 135 at which light is reflected is formed at the PD 130. This reflecting surface 135 may be formed at a surface (the bottom surface in FIG. 5) of the PD 130 as a groove with a V-shaped section. Light having been taken in through an end surface 130a of the PD 130 is reflected at the reflecting surface 135 in the PD 130 and is then taken in at a light receiving surface 132.

Reference numeral 160 in FIG. 2 indicates a standard 2 mm diameter ball lens. The ball lens 160 is used to direct light coming in from the outside via a fiber (not shown) into the wavelength division multiplexer 150 and also to couple light from the wavelength division multiplexer 150 to the fiber.

The optical module 100 in the embodiment adopts the structure described above.

Figure 6:
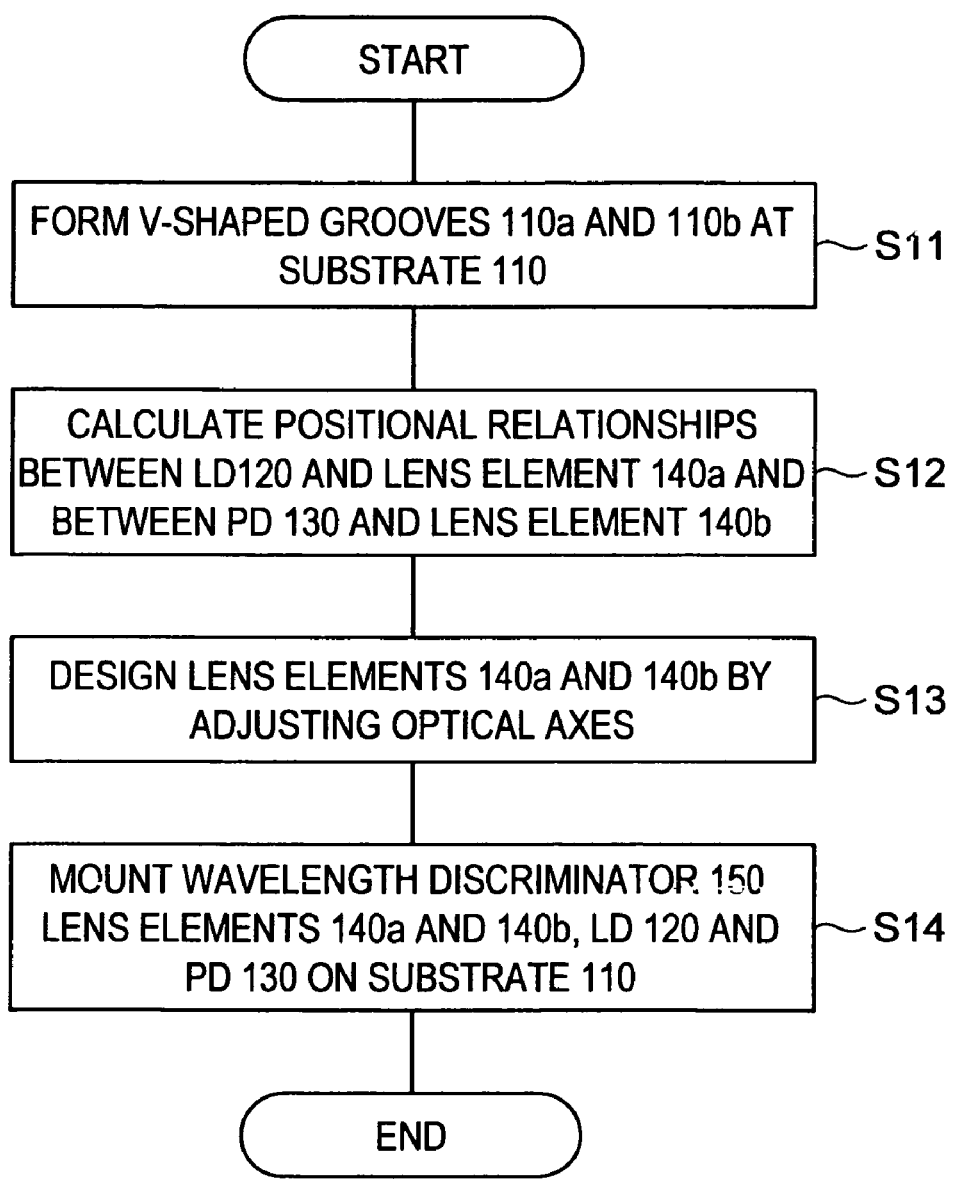
FIG. 6 presents a flowchart of the manufacturing process through which the optical module in the first embodiment is manufactured.

Next, the method adopted when manufacturing the optical module 100 is explained in reference to FIG. 6.

First, the substrate 110 and the lens elements 140a and 140b are formed. The other components such as the LD 120, the PD 130 and the wavelength division multiplexer 150 should be manufactured in advance.

(Formation of V-shaped Groove 110a and 110b (Step S11))

Figure 4:
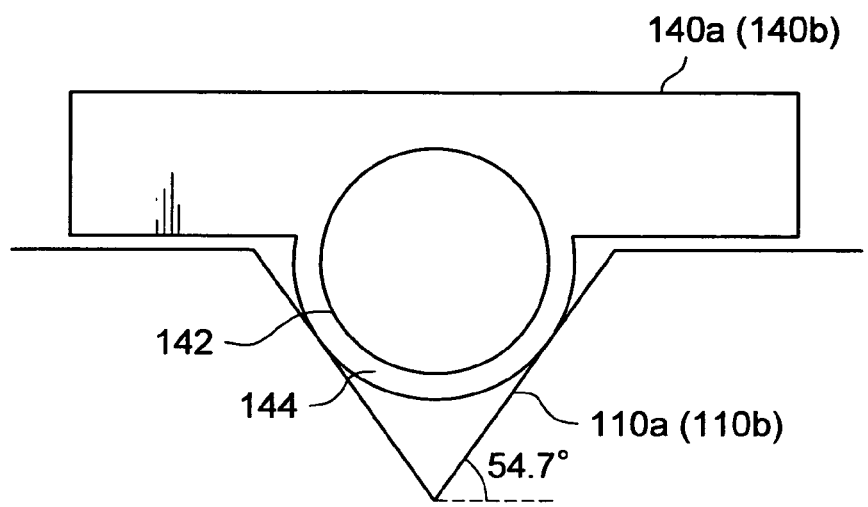
FIG. 4 schematically illustrates how a lens element is mounted at a groove portion.

The substrate 110 is etched to form the V-shaped groove 110a and 110b at which the lens elements 140a and 140b are to be respectively mounted (step S11). The V-shaped groove 110a and 110b are formed with precision so as to set the (111) plane group of the silicon material at their inclined surfaces. Accordingly, the section of the groove portion 110a and 110b forms a 54.7° angle, as shown in FIG. 4. During this step, the rectilinear U-shaped groove 110c and the stage 110e are also formed through etching as necessary.

(Calculation of Positional Relationships to be Achieved Between LD 120 and Lens Element 140a and Between PD 130 and Lens Element 140b (Step S12))

Next, the positional relationship to be achieved between the LD 120 and the lens element 140a is determined through calculation and the positional relationship to be achieved between the PD 130 and the lens element 140b is also determined through calculation (step S12). Since the lens elements 140a and 140b are mounted at the groove portions 110a and 110b of the substrate 110, the positions to be assumed by the lens elements 140a and 140b can be calculated accurately based upon the shape of the groove portions 110a and 110b and the shapes of the lens elements 140a and 140b.

(Designing Lens Elements 140a and 140b (Step S13))

Next, based upon the results of the calculation executed to determine the positional relationship between the LD 120 and the lens element 140a, the lens element 140a is designed by adjusting its optical axis, and also, based upon the results of the calculation executed to determine the positional relationship between the PD 130 and the lens element 140b, the lens element 140b is designed by adjusting its optical axis (step S13).

As shown in FIG. 3, a diffracting optical element with a diameter of 110 μm is formed to constitute a lens portion 142, at both the lens elements 140a and 140b. Such diffracting optical elements may be formed by etching desired areas of the optical substrate with a mask. The lens elements 140a and 140b can be formed by using a photomask pattern which includes patterns corresponding to the shapes of the lens elements 140a and 140b and cutting the substrate to a desired depth through deep etching or the like.

In addition, the lens elements 140a and 140b are each constituted with a silicon micro-lens in the embodiment and, as a result, the lens elements can be formed with high precision through etching and furthermore, lens elements can be formed in a large quantity in a batch. There is an added advantage in that lens elements that are smaller than lens elements in the related art (e.g., ball lenses) can be formed.

(Mounting Individual Components (Step S14))

Next, the wavelength division multiplexer 150, the lens elements 140a and 140b having undergone the optical axis adjustment, the LD 120 and the PD 130 are mounted on the substrate 110 (step S14). The structure adopted in the embodiment allows the components to be mounted with, for instance, an automatic mounter and high-precision mounting is assured simply by setting the individual components on the substrate 110 having been formed with precision.

First, the LD 120 and the PD 130, positioned with high precision from above the substrate 110 by using markers, are bonded through soldering or the like.

Next, the lens elements 140a and 140b are positioned at the substrate 110 by using markers along their optical axes and then they are bonded at the V-shaped groove 110a and 110b with a thermosetting resin, as shown in FIG. 4. It is to be noted that the lens elements may be bonded by using an adhesive other than a thermosetting resin, such as a UV setting resin or solder.

The accuracy with which the LD 120, the PD 130 and the lens elements 140a and 140b are mounted is dependent upon the accuracy of the bonder, and they can be mounted with ease to an accuracy of ±3 μm. The lens elements 140a and 140b can also be mounted with high accuracy along directions perpendicular to their optical axes, with an accuracy of ±1 μm. Namely, by setting the lens elements 140a and 140b at the V-shaped groove 110a and 110b, they are positioned along the perpendicular directions, so as to set the optical axes at the centers of the lens portions 142 opposite the exit point at the LD 120 and the entry point at the PD 130 respectively. This means that the mounting accuracy with which the lens elements 140a and 140b are mounted along the perpendicular directions is dependent upon the accuracy with which the bonding areas at the V-shaped grooves are processed and the accuracy with which the V-shaped grooves are processed. The lens elements can be mounted with an accuracy of ±1 μm.

Then, the wavelength division multiplexer 150 is placed at the stage 110e of the substrate 110 and is fixed with a thermosetting resin or a UV setting resin.

Through the process described above, the optical module 100 can be manufactured with ease and precision.

(Advantages of the First Embodiment)

As explained above, when mounting the two optical elements (the LD 120 and the PD 130) corresponding to different wavelengths on a single substrate 110, the lens elements 140a and 140b each constituted with a silicon micro-lens are disposed at the groove structures 110a and 110b used for positioning and formed through etching at the substrate 110 in the embodiment. In addition, the wavelength division multiplexer 150 is a cube-type dielectric filter. As a result, the optical module can be provided as a compact unit.

In addition, since the LD 120, the PD 130, the lens elements 140a and 140b and the wavelength division multiplexer 150 can be mounted all together onto the single substrate 110 by using an automatic mounter, no special time slot for optical alignment needs to be allotted during the mounting process. This greatly improves the mass productivity and ultimately, the module can be offered at a more affordable price.

(Second Embodiment)

The second embodiment of the present invention is now explained. An explanation is given in reference to the embodiment by focusing on the structural features that distinguish it from the first embodiment.

Figure 7:
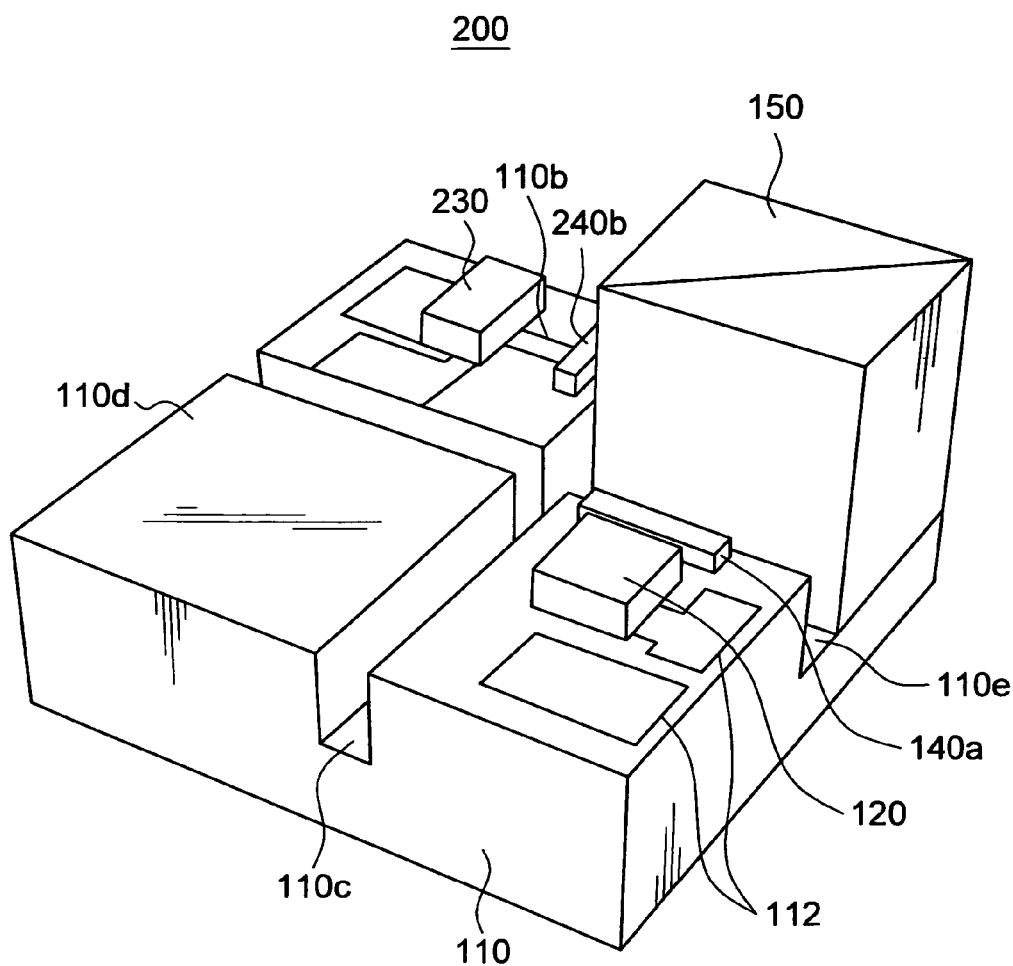
FIG. 7 is a perspective schematically showing the structure adopted in the optical module achieved in a second embodiment.

As shown in FIG. 7, an optical module 200 achieved in the embodiment includes an LD 120, a PD 230, lens elements 140a and 240b and a wavelength division multiplexer 150, all mounted on a substrate 110 at which V-shaped groove 110a and 110b are formed. Since components other than the PD 230 and the lens element 240b are substantially identical to those in the first embodiment, a repeated explanation thereof is omitted.

The PD 230 is a surface-entry type light receiving element, unlike the PD used in the first embodiment. It is bonded and fixed with solder or the like with its entry surface 232 facing down.

Figure 8:
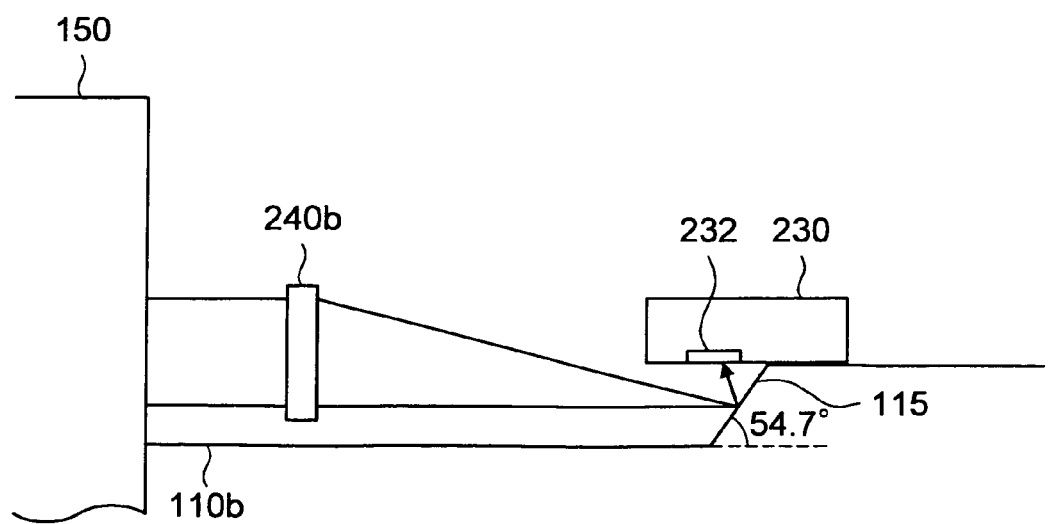
FIG. 8 illustrates the optical path extending between the lens element and the PD in the second embodiment.

Unlike the lens element used in the first embodiment, the lens elements 240b disposed near the PD 230 focuses the light entering from the wavelength division multiplexer 150 and, at the same time, deflects the light downward so that the light is reflected at an end of the V-shaped groove 110b. At the end of the V-shaped groove 110b, a reflecting film such as a gold film is deposited in advance. Thus, as shown in FIG. 8, the reflected light advances upward and enters the entry surface of the PD 230.

Figure 9A:
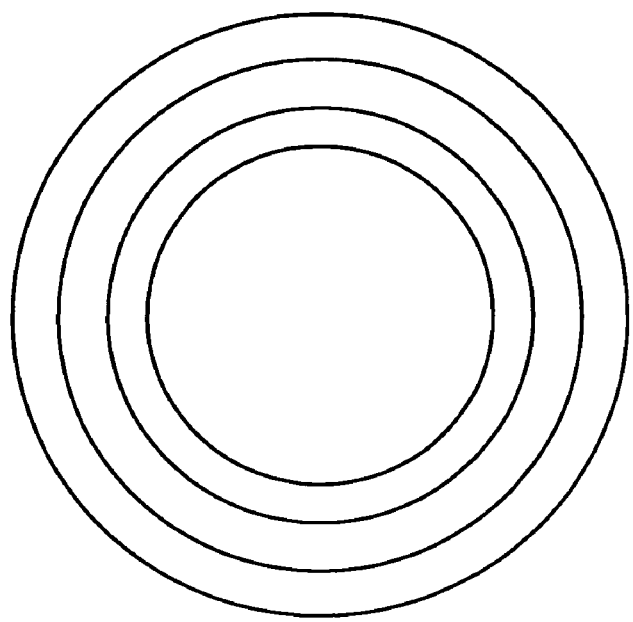
FIG. 9 shows the lens portion 142.
Figure 9B:
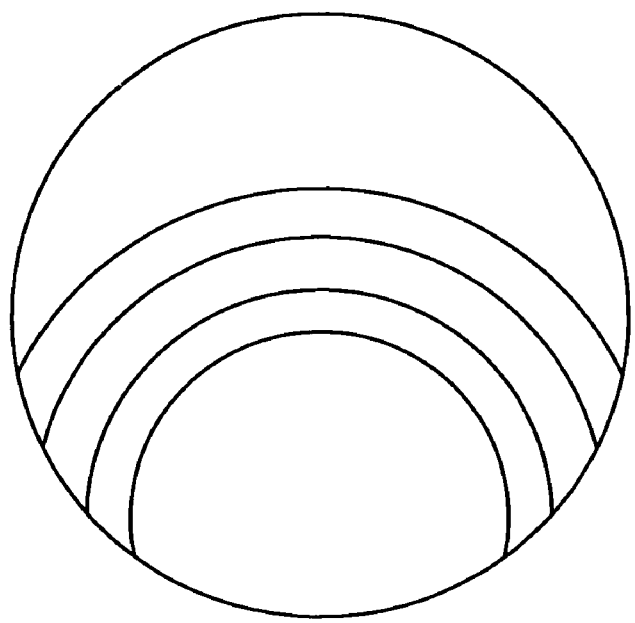

FIG. 9 shows in detail the lens portion 142 at the lens element 240b. FIG. 9(a) shows a standard lens, and FIG. 9(b) shows the lens portion 142 achieved in the embodiment. The light can be bent downward by forming the lens portion 142 so as to achieve the shape shown in FIG. 9(b) with an altered mask pattern.

Figure 10:
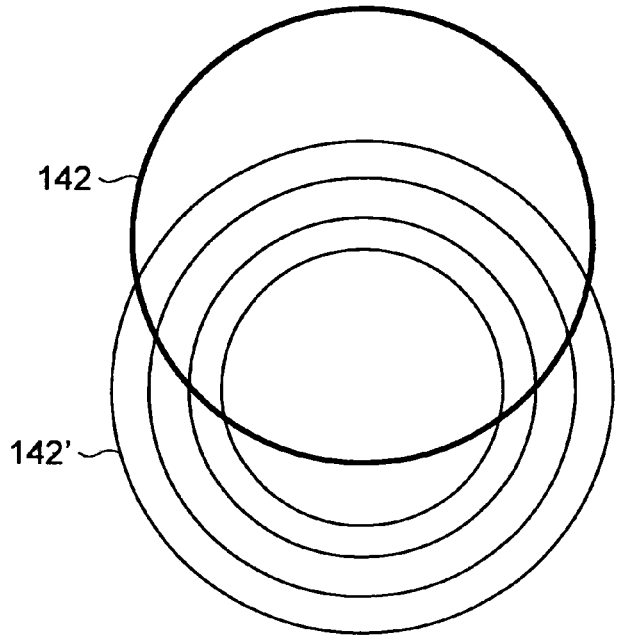
FIG. 10 shows the lens portion 142.

In addition, the lens portion 142 may be formed as described below, as an alternative. Namely, as shown in FIG. 10, a standard lens 142' may be first formed, and then, a lens portion 142 similar to that in FIG. 9 may be formed by offsetting it upward before the etching process.

The optical module 200 in the embodiment adopts the structure described above.

Figure 11:
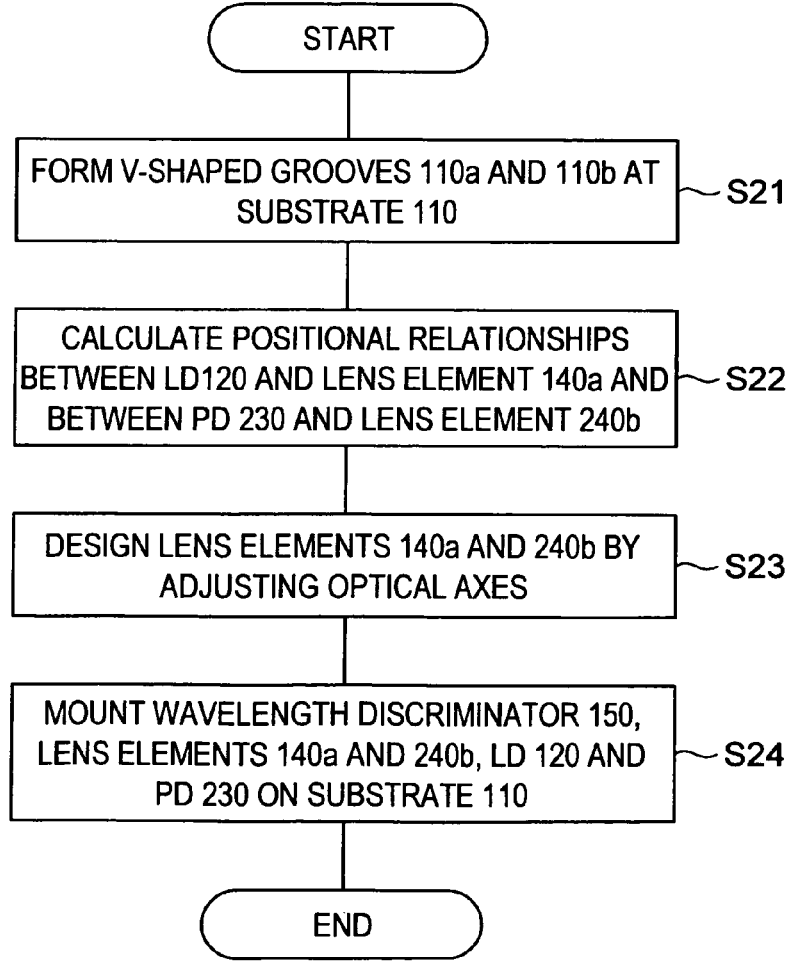
FIG. 11 presents a flowchart of the manufacturing process through which the optical module in the second embodiment is manufactured.

Next, the method adopted when manufacturing the optical module 200 is explained in reference to FIG. 11

First, the substrate 110 and the lens elements 140a and 240b are formed. The other components such as the LD 120, the PD 230 and the wavelength division multiplexer 150 should be manufactured in advance.

(Formation of V-shaped Groove 110a and 110b (Step S21))

The substrate 110 is etched to form the V-shaped groove 110a and 110b at which the lens elements 140a and 240b are to be respectively mounted (step S21). The V-shaped groove 110a and 110b are formed with precision so as to set the (111) plane group of the silicon material at their inclined surfaces. Accordingly, the section of the groove portion 110a and 110b forms a 54.7° angle, as shown in FIG. 4. During this step, the rectilinear U-shaped groove 110c and the stage 110e are also formed through etching as necessary.

(Calculation of Positional Relationships to be Achieved Between LD 120 and Lens element 140a and Between PD 230 and Lens Element 240b (Step S22))

Next, the positional relationship to be achieved between the LD 120 and the lens element 140a is determined through calculation and the positional relationship to be achieved between the PD 230 and the lens element 240b is also determined through calculation (step S22). Since the lens elements 140a and 240b are mounted at the groove portions 110a and 110b of the substrate 110, the positions to be assumed by the lens elements 140a and 240b can be calculated accurately based upon the shape of the groove portions 110a and 110b and the shapes of the lens elements 140a and 240b.

(Designing Lens Elements 140a and 240b (Step S23))

Next, based upon the results of the calculation executed to determine the positional relationship between the LD 120 and the lens element 140a, the lens element 140a is designed by adjusting its optical axis, and also, based upon the results of the calculation executed to determine the positional relationship between the PD 230 and the lens element 240b, the lens element 240b is designed by adjusting its optical axis (step S23). In other words, the optical axis of the lens element 240b is adjusted so that the light from the wavelength division multiplexer 150 travels via the lens element 240b, is reflected at an end 115 of the groove portion 110b and enters a light receiving surface 232 at the PD 230, as shown in FIG. 8.

As shown in FIG. 3, a diffracting optical element with a diameter of 110 μm is formed to constitute a lens portion 142, at both the lens elements 140a and 240b. Such diffracting optical elements may be formed by etching desired areas of the optical substrate with a mask. The lens elements 140a and 240b can be formed by using a photomask pattern which includes patterns corresponding to the shapes of the lens elements 140a and 240b and cutting the substrate to a desired depth through deep etching or the like.

In addition, the lens elements 140a and 240b are each constituted with a silicon micro-lens in the embodiment and, as a result, the lens elements can be formed with high precision through etching and furthermore, lens elements can be formed in a large quantity in a batch. There is an added advantage in that lens elements that are smaller than lens elements in the related art (e.g., ball lenses) can be formed.

(Mounting Individual Components (Step S24))

Next, the wavelength division multiplexer 150, the lens elements 140a and 240b having undergone the optical axis adjustment, the LD 120 and the PD 230 are mounted on the substrate 110 (step S24). The structure adopted in the embodiment allows the components to be mounted with, for instance, an automatic mounter, and high precision mounting is assured simply by setting the individual components on the substrate 110 having been formed with precision.

First, the LD 120 and the PD 230, positioned with high precision from above the substrate 110 by using markers, are bonded through soldering or the like. During this step, the PD 230 is bonded with its entry surface 232 facing down (toward the substrate 110), as shown in FIG. 8.

Next, the lens elements 140a and 240b are positioned at the substrate 110 by using markers along their optical axes and then they are bonded at the V-shaped groove 110a and 110b with a thermosetting resin, as shown in FIG. 4. It is to be noted that the lens elements may be bonded by using an adhesive other than a thermosetting resin, such as a UV setting resin or solder.

The accuracy with which the LD 120, the PD 230 and the lens elements 140a and 240b are mounted is dependent upon the accuracy of the bonder, and they can be mounted with ease to an accuracy of ±3 µm. The lens elements 140a and 240b can also be mounted with high accuracy along directions perpendicular to their optical axes, with an accuracy of ±1 µm. Namely, by setting the lens elements 140a and 240b at the V-shaped groove 110a and 110b, they are positioned along the perpendicular directions, so as to set the optical axes at the centers of the lens portions 142 opposite the exit point at the LD 120 and the entry point at the PD respectively. This means that the mounting accuracy with which the lens elements 140a and 240b are mounted along the perpendicular directions is dependent upon the accuracy with which the bonding areas at the V-shaped grooves are processed and the accuracy with which the V-shaped grooves are processed. The lens elements can be mounted with an accuracy of ±1 µm.

Then, the wavelength division multiplexer 115 is placed at the stage 110e of the substrate 110 and is fixed with a thermosetting resin or a UV setting resin.

Through the process described above, the optical module 200 can be manufactured with ease and precision.

(Advantages of the Second Embodiment)

As in the first embodiment, since the LD 120, the PD 230, the lens elements 140a and 240b and the wavelength division multiplexer 150 can be mounted all together onto the single substrate 110 by using an automatic mounter, no special time slot for optical alignment needs to be allotted during the mounting process. This greatly improves the mass productivity and ultimately, the module can be offered at a more affordable price. In addition, since the surface-entry type PD 230 is not as expensive as the side-illuminated PD 130 used in the first embodiment, a further reduction in the module price is achieved.

It is to be noted that while an explanation is given in reference to the embodiment on an example of an application to be adopted on the light-receiving element (PD 230) side, the present invention is not limited to this example and may be adopted with equal effectiveness on the light emitting element side. Namely, it may be adopted in a structure in which the light emitted from the LD 120 is reflected at the end of the V-shaped groove 110a and is guided to the wavelength division multiplexer 150.

(Third Embodiment)

The third embodiment of the present invention is now explained. An explanation is given in reference to the embodiment by focusing on the structural features that distinguish it from the second embodiment.

Figure 12:
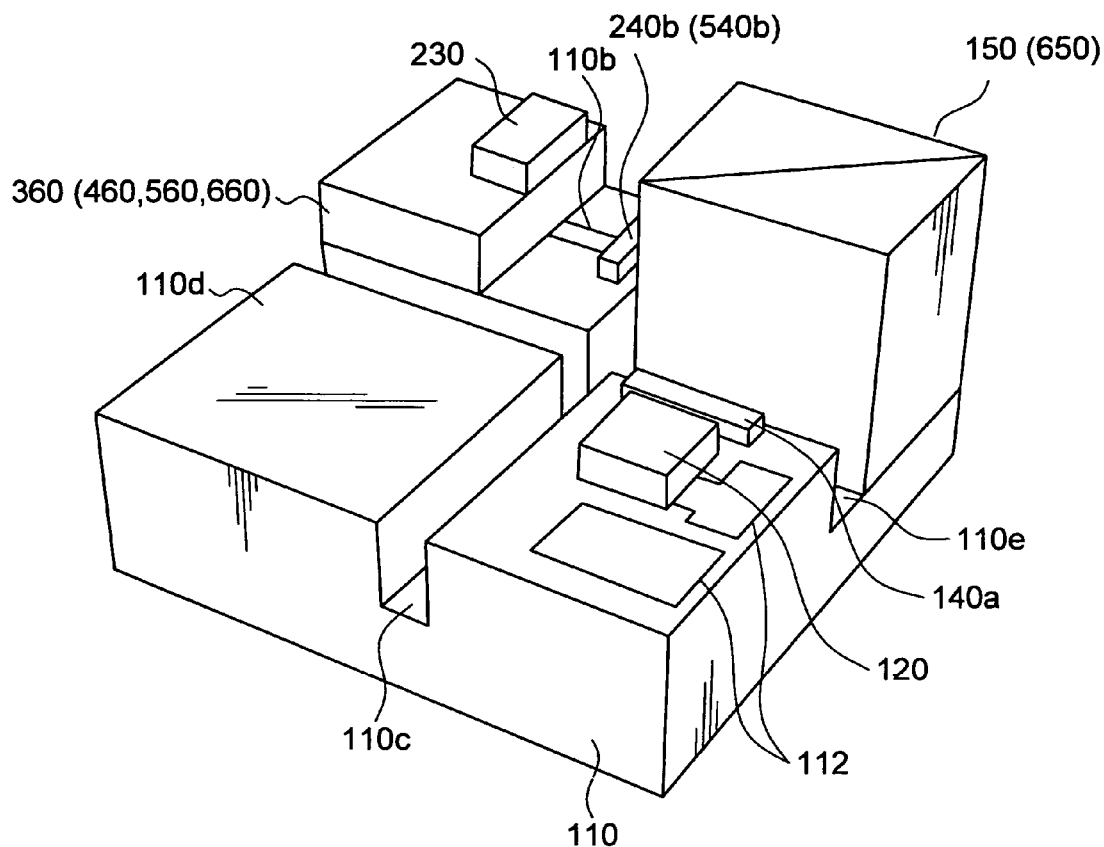
FIG. 12 is a perspective schematically showing the structure adopted in the optical modules achieved in third through sixth embodiments.

As shown in FIG. 12, an optical module 300 achieved in the embodiment includes an LD 120, a surface-entry type PD 230, lens elements 140a and 240b, a wavelength division multiplexer 150 and a light transmitting glass substrate 360 attached to the lower surface of the PD 230 all mounted on the substrate 110 at which V-shaped groove 110a and 110b are formed. Since components other than the glass substrate 360 are substantially identical to those in the second embodiment, a repeated explanation thereof is omitted.

Figure 13:
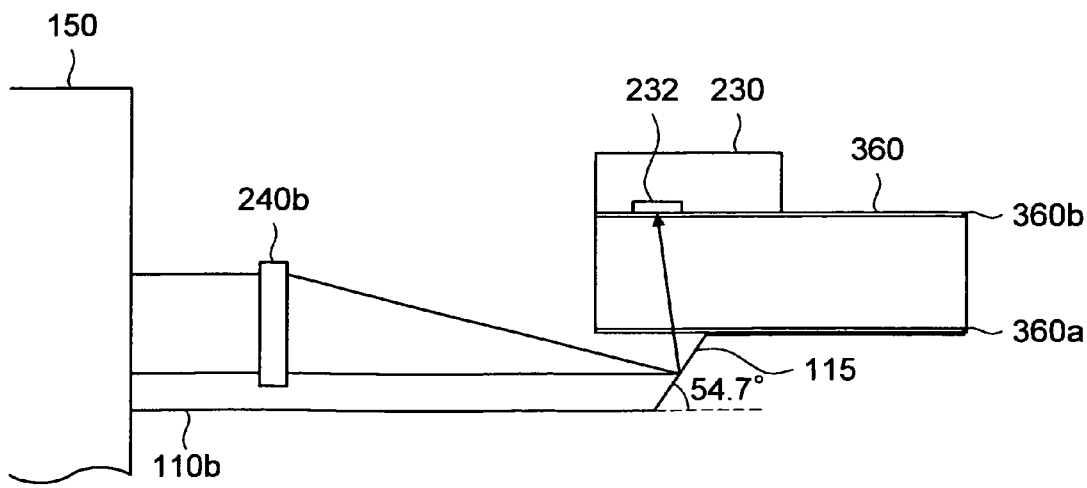
FIG. 13 illustrates the optical path extending between the lens element and the PD in the third embodiment.

As shown in FIG. 12, the glass substrate 360 is inserted between the V-shaped groove 110 and the PD 230, and has a thickness of approximately 300 µm. As shown in FIG. 13, AR coatings 360a and 360b are each applied at one of the two surfaces of the glass substrate 360, which is a substrate transparent to specific wavelengths of the light used in the module. The AR coating is a type of reflection-reducing (non-glare) treatment, through which a transparent thin-film is formed at the surfaces of the glass substrate 360 by vacuum-depositing magnesium fluoride or the like so as to block external light from the illumination or the like through interference. The films have a thickness equal to ¼ of the wavelength of the transmitted light. The external light having entered is split into light reflected at the surface of the film and light that is transmitted further and then reflected inside the substrate. Since the split light beams have opposite phases offset from each other by ½ wavelength, they cancel each other out, which reduces the manifestation of reflected light.

As in the second embodiment, the PD 230 is a surface-entry type PD which is bonded and fixed with solder or the like onto the glass substrate 360 having an electrode pattern formed thereupon, with the entry surface of the PD facing down. The assembly of the glass substrate 360 and the PD 330 bonded together is then bonded onto a support substrate 110 and is fixed by using a thermosetting resin or a UV setting resin.

As in the second embodiment, the lens element 240b focuses the light entering from the wavelength division multiplexer and, at the same time, deflects the light downward to the end of the V-shaped groove 110b so that the light is reflected at the end. As shown in FIG. 13, the reflected light advances upward and enters the PD 230.

(Advantages of the Third Embodiment)

In addition to the advantages of the second embodiment described earlier, the following advantage is achieved in the third embodiment. Namely, the presence of the glass substrate 360 inserted under the PD 230 reduces the extent of electrical crosstalk, which is likely to occur when the LD 120 and the PD 230 are mounted on the same substrate 110.

(Fourth Embodiment)

The fourth embodiment of the present invention is now explained. An explanation is given in reference to the embodiment by focusing on the structural features that distinguish it from the third embodiment.

As shown in FIG. 12, an optical module 400 achieved in the embodiment includes an LD 120, a surface-entry type PD 230, lens elements 140a and 240b, a wavelength division multiplexer 150 and a light transmitting glass substrate 460 attached to the lower surface of the PD 230 all mounted on the substrate 110 at which V-shaped groove 110a and 110b are formed. Since components other than the glass substrate 460 are substantially identical to those in the third embodiment, a repeated explanation thereof is omitted.

Figure 14:
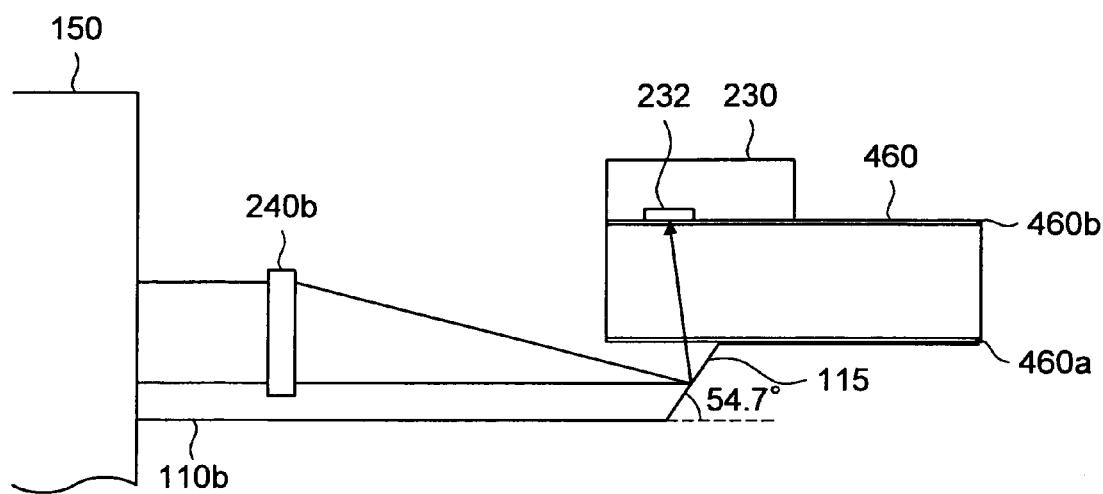
FIG. 14 shows the structure adopted in the fourth embodiment which includes a bandpass filter.

As shown in FIG. 14, an AR coating 460b is applied to one surface of the glass substrate 460 with a bandpass filter 460a, which only allows incoming light with a wavelength of, for instance, 1.49 μm to be transmitted, formed at the other surface. The assembly achieved by bonding the glass substrate 460 and the PD 230 together is then bonded onto a support substrate 110 and is fixed with a thermosetting resin or a UV setting resin.

(Advantages of the Fourth Embodiment)

The following advantage is achieved in addition to advantages similar to those of the third embodiment. Namely, optical crosstalk caused by light with a wavelength other than the target wavelength, such as light (with a wavelength of, for instance, 1.3 μm) emitted from the LD 120 or light with another wavelength (e.g., 1.55 μm) originating from an external network, is reduced with the presence of the glass substrate 460 equipped with a bandpass filter, which is inserted under the PD 230.

(Fifth Embodiment)

The fifth embodiment of the present invention is now explained. An explanation is given in reference to the embodiment by focusing on the structural features that distinguish it from the fourth embodiment.

As shown in FIG. 12, an optical module 500 achieved in the embodiment includes an LD 120, a surface-entry type PD 230, lens elements 140a and 540b, a wavelength division multiplexer 150 and a light transmitting glass substrate 560 attached to the lower surface of the PD 230 all mounted on the substrate 110 at which V-shaped groove 110a and 110b are formed. Since components other than the lens element 540b and the glass substrate 560 are substantially identical to those in the fourth embodiment, a repeated explanation thereof is omitted.

Figure 15:
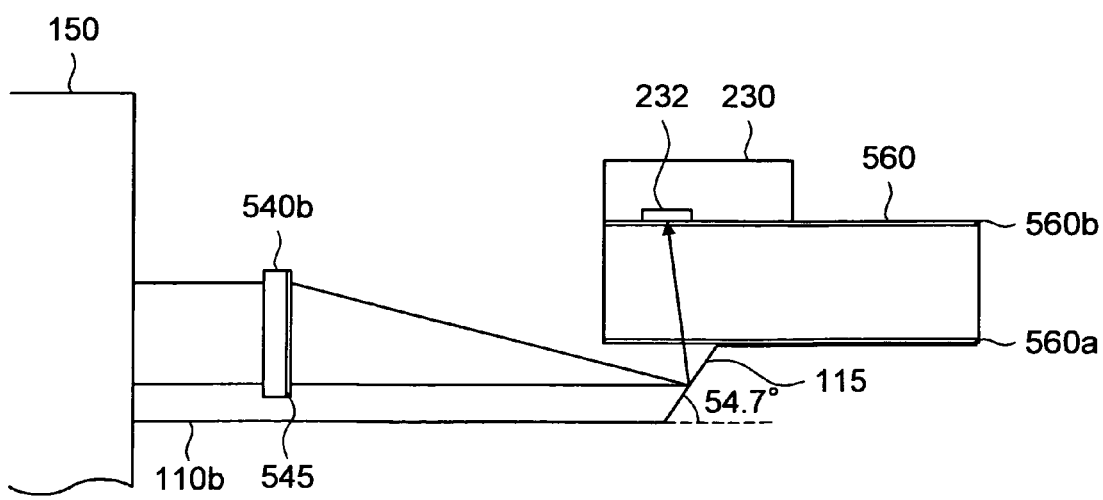
FIG. 15 shows the structure adopted in the fifth embodiment which includes a long wavelength pass filter and a short wavelength pass filter.

As shown in FIG. 15, an AR coating is applied to one surface (560a or 560b) of the glass substrate 560, with a short wavelength pass filter that blocks light with wavelengths greater than that of the incoming light, i.e., a short wavelength pass filter that allows light with a wavelength equal to or less than, for instance, 1.49 μm to be transmitted, formed at the other surface of the glass substrate 560. The assembly achieved by bonding the glass substrate 560 and the PD 530 together is then bonded onto a support substrate 110 and is then fixed with a thermosetting resin or a UV setting resin.

At the lens element 540b disposed near the PD 230, a long wavelength pass filter that blocks light with wavelengths less than that of the incoming light, i.e., a long wavelength pass filter that allows light with a wavelength equal to or greater than, for instance, 1.49 μm, to be transmitted is formed through film formation at the surface 545 on the side opposite from the lens portion formation surface, as shown in FIG. 15. The light having passed through the long wavelength pass filter and been reflected at the end surface of the V-shaped groove 110b travels upward to enter the PD 230.

(Advantages of the Fifth Embodiment)

As explained above, the embodiment lessens the extent of electrical crosstalk and optical crosstalk, as does the fourth embodiment. The yield of the bandpass filter used in the fourth embodiment is less than ideal and it may be more expensive to mass-produce such a bandpass filter than two separate filters, a long wavelength pass filter and a short wavelength pass filter. In the fifth embodiment, two separate filters, i.e., a long wavelength pass filter and a short wavelength pass filter are used and thus, the filter yield is improved, without creating the additional cost of having to mount separate members, thereby lowering the filter cost.

It is to be noted that the filters may be disposed at positions reversed from those described above. Namely, a long wavelength pass filter may be formed at the lens element 540b and a short wavelength pass filter may be formed at the bottom surface of the glass substrate 560. However, the light with a wavelength of 1.55 μm originating from the outside can be filtered with greater ease with a short wavelength pass filter disposed at the lens element 540b as described earlier, and in addition, the light with a wavelength of 1.3 μm originating from the LD 120 can be filtered with greater ease by using a long wavelength pass filter disposed at the glass substrate 560.

(Sixth Embodiment)

The sixth embodiment of the present invention is now explained. An explanation is given in reference to the embodiment by focusing on the structural features that distinguish it from the fourth embodiment.

As shown in FIG. 12, an optical module 600 achieved in the embodiment includes an LD 120, a surface-entry type PD 230, lens elements 140a and 240b, a wavelength division multiplexer 650 and a light transmitting glass substrate 560 attached to the lower surface of the PD 230 all mounted on the substrate 110 at which V-shaped groove 110a and 110b are formed. Since components other than the glass substrate 560 and the wavelength division multiplexer 650 are substantially identical to those in the fourth embodiment, a repeated explanation thereof is omitted.

Figure 16:
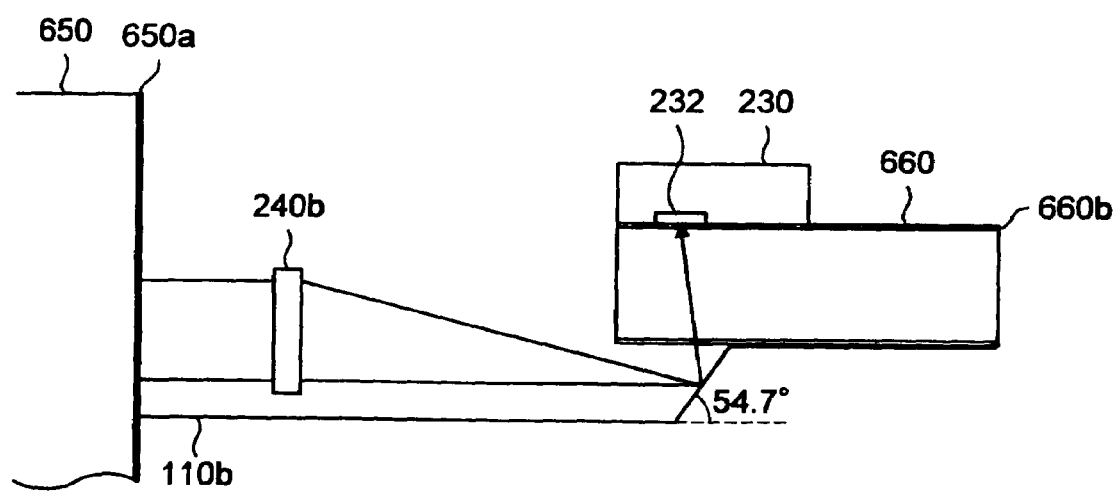
FIG. 16 shows the structure adopted in the sixth embodiment which includes a long wavelength pass filter and a short wavelength pass filter.

As shown in FIG. 16, an AR coating is applied to one surface of the glass substrate 660, with a short wavelength pass filter that blocks light with wavelengths greater than that of the incoming light, i.e., a short wavelength pass filter that allows only light with wavelengths equal to or less than, for instance, 1.49 μm to be transmitted, formed at the other surface of the glass substrate 660, as in the fifth embodiment.

As shown in FIG. 16, a long wavelength pass filter that blocks light with wavelengths less than that of the incoming light, i.e., a long wavelength pass filter that allows only light with wavelengths equal to or greater than, for instance, 1.49 μm to be transmitted, is formed through film formation at an optical path surface 650a of the wavelength division multiplexer 650, extending to the PD. Light having entered the PD 230 from the outside undergoes wavelength selection at the wavelength division multiplexer 650 and then enters the lens element 240b where it becomes focused. The focused light undergoes wavelength selection again at the short wavelength pass filter 660b on the glass substrate 660 attached to the bottom surface of the PD 230 and enters the PD 230.

(Advantages of the Sixth Embodiment)

As explained above, the sixth embodiment lessens the extent of electrical crosstalk and optical crosstalk, as does the fourth embodiment. The yield of the bandpass filter used in the fourth embodiment is less than ideal and it may be more expensive to mass-produce such a bandpass filter than two separate filters, i.e., a long wavelength pass filter and a short wavelength pass filter. In the sixth embodiment, two separate filters, i.e., a long wavelength pass filter and a short wavelength pass filter are used and thus, the filter yield is improved, without creating the additional cost of having to mount separate members, thereby lowering the filter cost.

In addition, while filters such as those used in the fourth and fifth embodiments need to be separately mounted in the related art, a long wavelength pass filter is formed as a film deposited at the optical path surface 650a of the wavelength division multiplexer 650 extending to the PD in the embodiment and thus, the cost of mounting a separate member is saved. In addition, since substrates of exactly the same size can be used, the module can be provided as a compact module unit. Since the module size can be as small as approximately 2 mm ×2 mm, its applications do not need to be limited by the sizes of specific packages including CAN, mini-DIL and butterfly.

It is to be noted that the filters may be disposed at positions reversed from those described above. Namely, a long wavelength pass filter may be formed at the wavelength division multiplexer 650 and a short wavelength pass filter may be formed at the bottom surface of the glass substrate 560. However, light with a wavelength of 1.55 μm originating from the outside can be filtered with greater ease with a short wavelength pass filter disposed at the wavelength division multiplexer 650 as described earlier, and in addition, the light with a wavelength of 1.3 μm originating from the LD 120 can be filtered with greater ease by using a long wavelength pass filter disposed at the glass substrate 560.

(Seventh Embodiment)

The seventh embodiment of the present invention is now explained. An explanation is given in reference to the embodiment by focusing on the structural features that distinguish it from the second embodiment.

Figure 17:
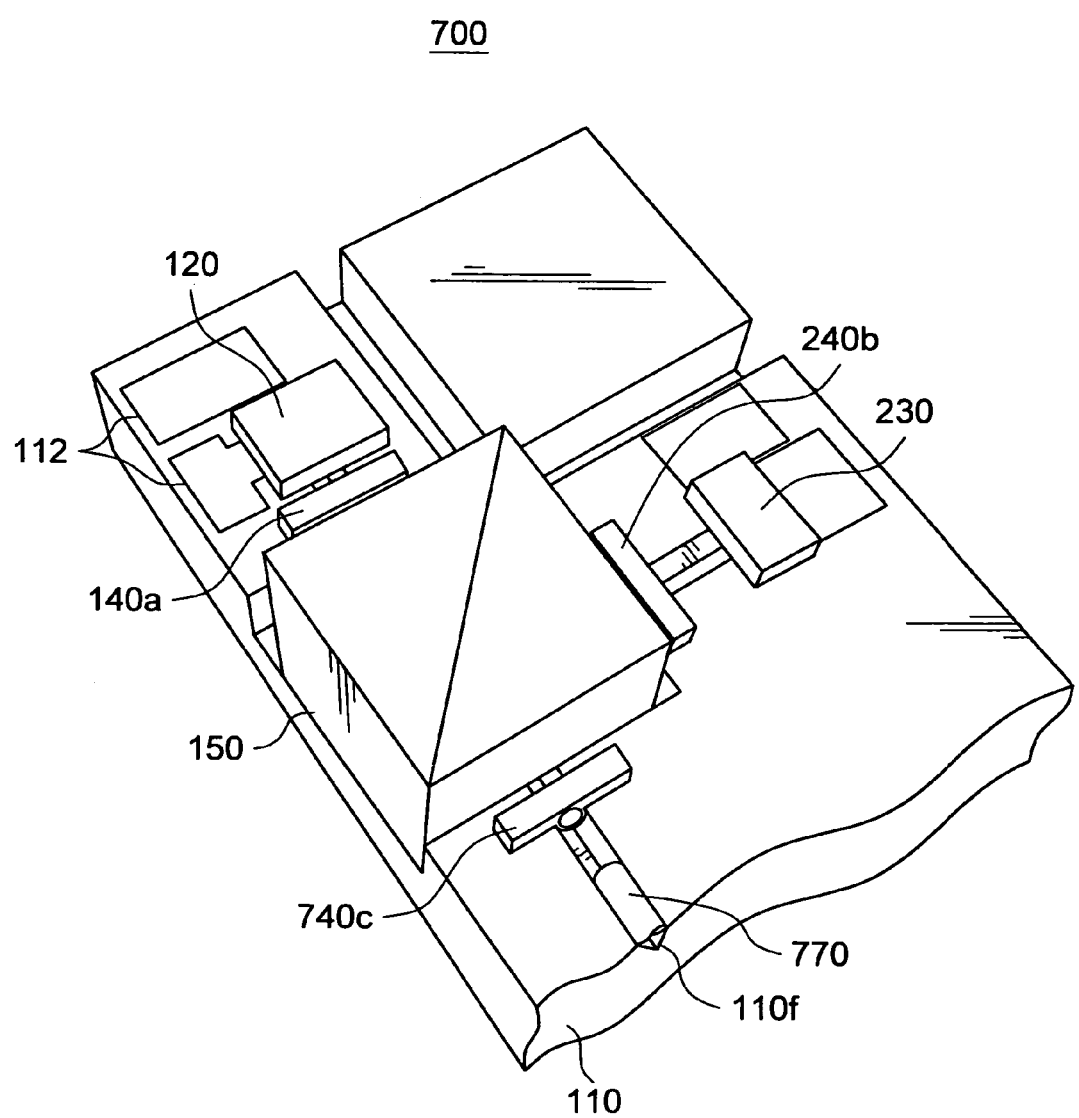
FIG. 17 is a perspective schematically showing the structure adopted in the optical module achieved in a seventh embodiment.

As shown in FIG. 17, an optical module 700 achieved in the embodiment includes an LD 120, a surface-entry type PD 230, lens elements 140a, 240b and 740c and a wavelength division multiplexer 150 all mounted on the substrate 110 at which V-shaped groove 110a and 110b are formed. Since components other than the lens element 740c are substantially identical to those in the second embodiment, a repeated explanation thereof is omitted.

The lens element 740c has a function of converting light from a fiber 770 to a parallel light beam and directing the parallel light beam into the wavelength division multiplexer 150, as well as altering the light having been emitted from the LD 120 and having passed through the wavelength division multiplexer 150 so that it enters the fiber 770.

(Advantages of the Seventh Embodiment)

As explained above, the seventh embodiment achieves the following advantages in addition to advantages similar to those of the first through sixth embodiments. Namely, while it is necessary to execute final alignment for the fiber and the lenses during the package mounting process in the modules achieved in the first through sixth embodiments, an optical adjustment is achieved simply by aligning the fiber in the seventh embodiment to achieve a further cost reduction. In addition, since a wavelength cut-off filter can be mounted at the rear surface of the lens element 740c or at a side surface of the wavelength division multiplexer 150, the extent of optical crosstalk is reduced as in the fourth through sixth embodiment.

(Eighth Embodiment)

The eighth embodiment of the present invention is now explained. An explanation is given in reference to the embodiment by focusing on the structural features that distinguish it from the seventh embodiment.

Figure 18:
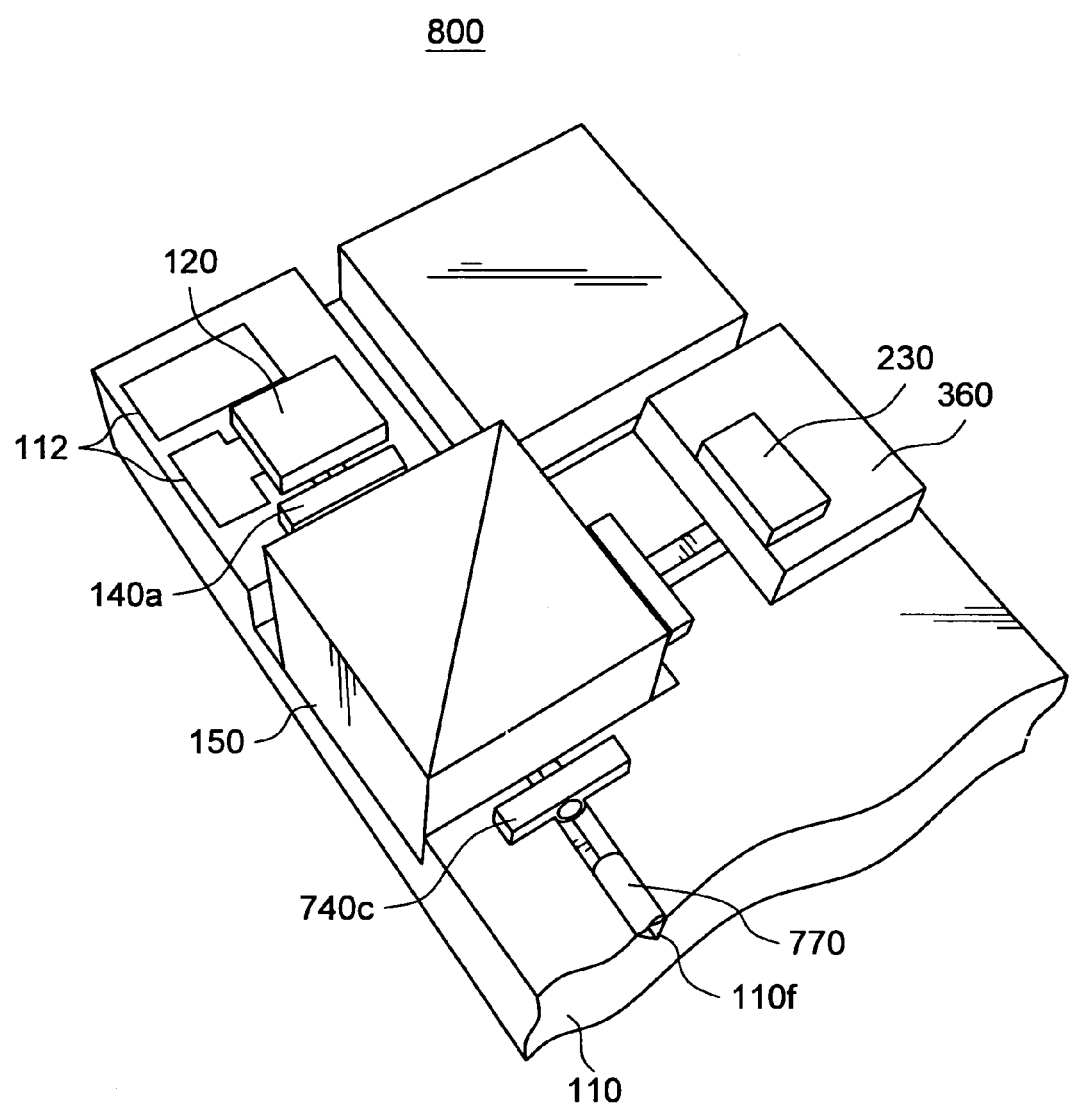
FIG. 18 is a perspective schematically showing the structure adopted in the optical module achieved in an eighth embodiment.

As shown in FIG. 18, an optical module 800 achieved in the embodiment includes an LD 120, a surface-entry type PD 230, lens elements 140a, 240b and 740c, a wavelength division multiplexer 150 and a light transmitting glass substrate 360 attached to the lower surface of the PD 230 all mounted on the substrate 110 at which V-shaped groove 110a and 110b are formed. Since components other than the glass substrate 360 are substantially identical to those in the second embodiment, a repeated explanation thereof is omitted.

An AR coating is applied to the two surfaces of the glass substrate 360 which is transparent to the specific wavelength of the light used in the embodiment. The assembly achieved by bonding the glass substrate 360 and the PD 230 together is then bonded onto a support substrate 110 and is fixed by using a thermosetting resin or a UV setting resin.

As in the second embodiment, the PD 230 is a surface-entry type PD which is bonded and fixed with solder or the like onto the glass substrate 360 having an electrode pattern formed thereupon with the entry surface of the PD facing down.

As in the second embodiment, the lens elements 240b focuses the light entering from the wavelength division multiplexer 150 and, at the same time, deflects the light downward to the end of the V-shaped groove so that the light is reflected at the end of the V-shaped groove. The reflected light advances upward and enters the PD.

(Advantages of the Eighth Embodiment)

The following advantages are achieved in the embodiment, in addition to advantages similar to those of the seventh embodiment. Namely, the presence of the glass substrate 360 inserted under the PD 230 reduces the extent of electrical crosstalk which is likely to occur when the LD 120 and the PD 230 are mounted onto a single substrate 110.

While the invention has been particularly shown and described with respect to preferred embodiments of the optical module according to the present invention by referring to the attached drawings, the present invention is not limited to these examples and it will be understood by those skilled in the art that various changes in form and detail may be made therein without departing from the spirit, scope and teaching of the invention.

For instance, while an explanation is given above in reference to the embodiments on an example in which the lens elements 140a and 140b are each constituted with a silicon micro-lens, the present invention is not limited to this example and lens elements constituted of quartz may be used instead.

Figure 19:
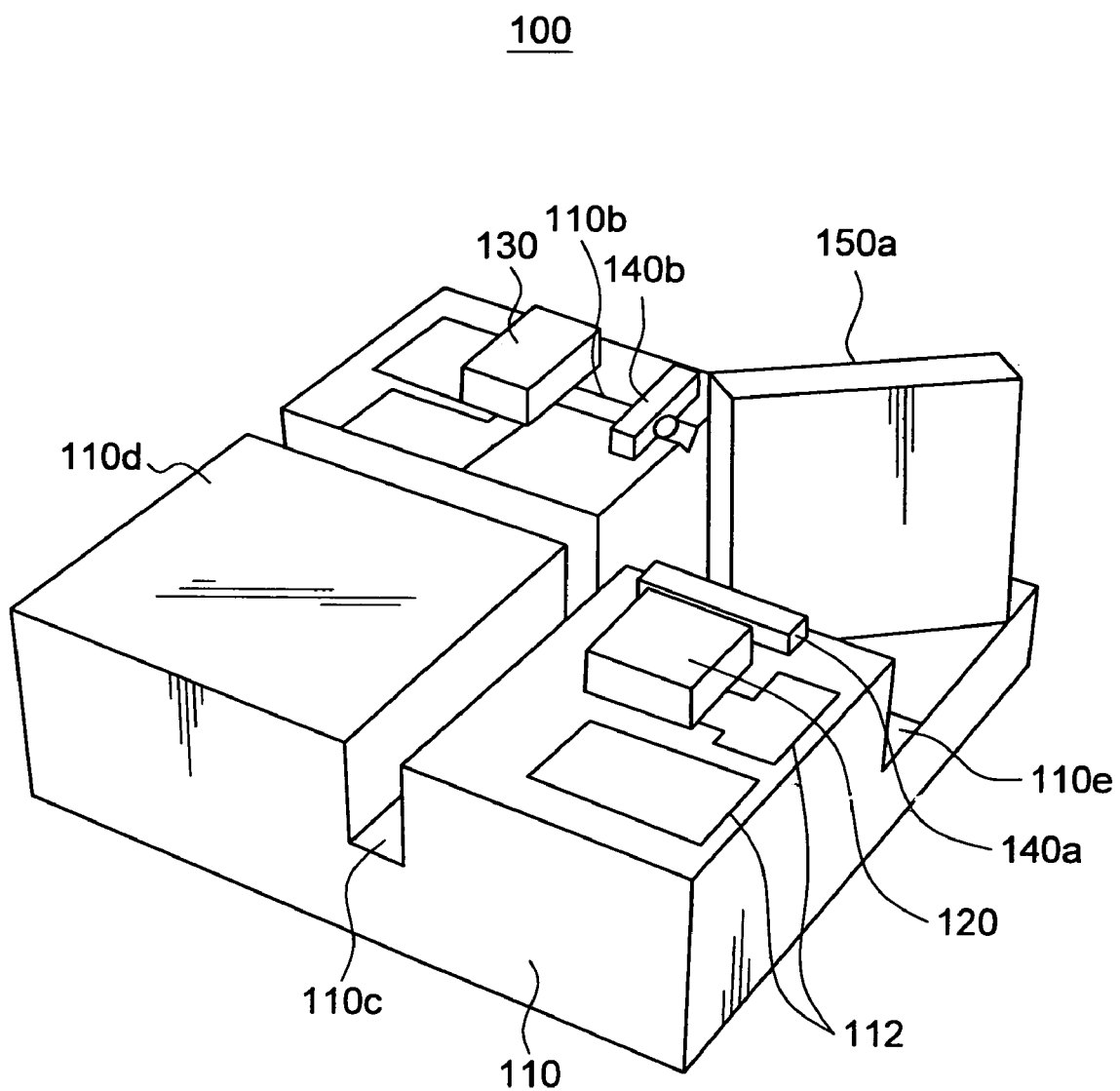
FIG. 19 is a perspective of an optical module that includes a plate-type filter.
Figure 20:
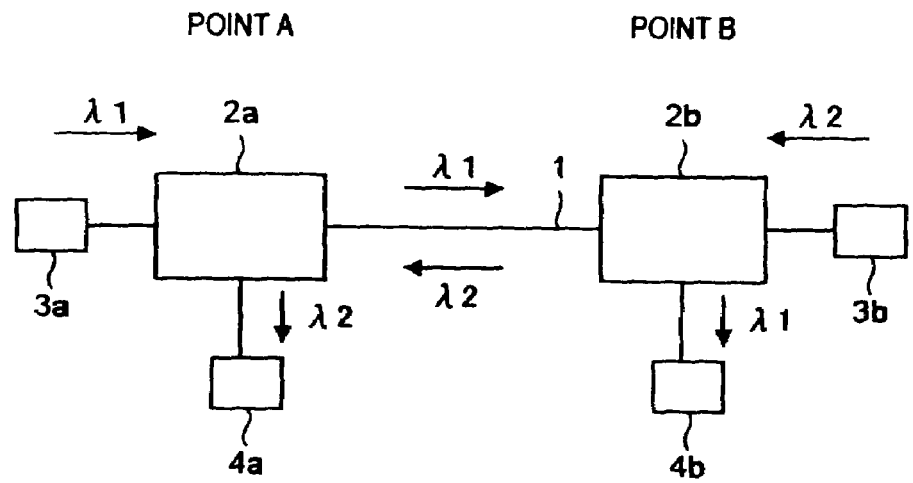
FIG. 20 schematically shows the structure adopted in an optical module in the related art.

In addition, while a cube filter is used in the embodiments, the present invention is not limited to this example and it may be adopted in conjunction with a plate filter. FIG. 19 shows a perspective on an optical module that includes a plate filter 150a. It is to be noted that components of this optical module other than the plate filter 150a are identical to those of the optical module shown in FIG. 1.

The present invention may be adopted in an optical module, and in particular, it may be adopted with great effectiveness in an optical transmission/reception module ideal in the exchange of at least two different types of the light signals with varying wavelengths propagated through a single optical fiber.

What is claimed is:

1. An optical module comprising:
   a substrate having a first groove structure formed through etching along a first direction and a second groove structure formed through etching along a second direction;
   a wavelength division multiplexer disposed on the substrate, which allows light to be transmitted or to be reflected, depending upon the wavelength thereof;
   a light emitting element-side lens element disposed on the first groove structure;
   a light receiving element-side lens element disposed on the second groove structure;
   a light emitting element disposed near an end of the first groove structure, which generates light to be emitted to the outside via the light emitting element-side lens element and the wavelength division multiplexer;
   a light receiving element disposed near an end of the second groove structure, which receives incoming light from the outside via the wavelength division multiplexer and the light receiving element-side lens element; and
   a light transmitting substrate inserted between the substrate and the light receiving element, wherein: the incoming light is received at the light receiving element via the wavelength division multiplexer, the light receiving element-side lens element and the light transmitting substrate; a short wavelength pass filter is formed on one surface of the light receiving element-side lens element; and a long wavelength pass filter is formed on one surface of the light transmitting substrate.

2. An optical module according to claim 1, wherein: the incoming light traveling via the wavelength division multiplexer and the light receiving element-side lens elements is first reflected at an end of the first groove structure and is then received at the light receiving element.

3. An optical module according to claim 1, wherein: a bandpass filter is formed on one surface of the light transmitting substrate.

4. An optical module according to claim 1, wherein: a reflection-reducing member is formed on at least one surface of the light transmitting substrate.

5. An optical module according to claim 1, wherein: a diffracting optical element is formed on both the light emitting element-side lens element and the light receiving element-side lens element.

6. An optical module according to claim 1 wherein: the light emitting element-side lens element and the light receiving element-side lens element are each constituted with a silicon micro-lens.

7. An optical module according to claim 1, further comprising: a third groove structure formed on the substrate to extend along the direction of the outgoing light and the incoming light; and an external-side lens element disposed near the third groove structure.

8. An optical module according to claim 7, wherein: a diffracting optical element is formed on the external-side lens element.

9. An optical module according to claim 7, wherein: the external-side lens element is constituted with a silicon micro-lens.

10. An optical module according to claim 1, wherein: light emitted from the light emitting element is converted to a parallel light beam at the light emitting side lens element.

11. An optical module comprising:
    a substrate having a first groove structure formed through etching along a first direction and a second groove structure formed through etching along a second direction;
    a wavelength division multiplexer disposed on the substrate, which allows light to be transmitted or to be reflected, depending upon the wavelength thereof;
    a light emitting element-side lens element disposed on the first groove structure;
    a light receiving element-side lens element disposed on the second groove structure;
    a light emitting element disposed near an end of the first groove structure, which generates light to be emitted to the outside via the light emitting element-side lens element and the wavelength division multiplexer;
    a light receiving element disposed near an end of the second groove structure, which receives incoming light from the outside via the wavelength division multiplexer and the light receiving element-side lens element; and
    a light transmitting substrate inserted between the substrate and the light receiving element, wherein: the incoming light is received at the light receiving element via the wavelength division multiplexer, the light receiving element-side lens element and the light transmitting substrate; a short wavelength pass filter is formed on one surface of the wavelength division multiplexer; and a long wavelength pass filter is formed on one surface of the light transmitting substrate.

12. An optical module according to claim 11, wherein: the incoming light traveling via the wavelength division multiplexer and the light receiving element-side lens elements is first reflected at an end of the first groove structure and is then received at the light receiving element.

13. An optical module according to claim 11, wherein: a bandpass filter is formed on one surface of the light transmitting substrate.

14. An optical module according to claim 11, wherein: a reflection-reducing member is formed on at least one surface of the light transmitting substrate.

15. An optical module according to claim 11, wherein: a diffracting optical element is formed on both the light emitting element-side lens element and the light receiving element-side lens element.

16. An optical module according to claim 11, wherein: the light emitting element-side lens element and the light receiving element-side lens element are each constituted with a silicon micro-lens.

17. An optical module according to claim 11, further comprising: a third groove structure formed on the substrate to extend along the direction of the outgoing light and the incoming light; and an external-side lens element disposed on the third groove structure.

18. An optical module according to claim 11, wherein: light emitted from the light emitting element is converted to a parallel light beam at the light emitting side lens element.

* * * * *